US 6,556,188 B1

(12) United States Patent
Cordner

(10) Patent No.: US 6,556,188 B1
(45) Date of Patent: Apr. 29, 2003

(54) THREE-DIMENSIONAL CHECK IMAGE VIEWER AND A METHOD OF HANDLING CHECK IMAGES IN AN IMAGE-BASED CHECK PROCESSING SYSTEM

(75) Inventor: Michael R. Cordner, Kitchener (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/513,566

(22) Filed: Feb. 25, 2000

(51) Int. Cl.[7] .................................................. G09G 5/00
(52) U.S. Cl. .......................................... 345/173; 283/57
(58) Field of Search ................................ 345/173, 901; 283/57, 58

(56) References Cited

U.S. PATENT DOCUMENTS

| | | | | |
|---|---|---|---|---|
| 3,980,323 A | * | 9/1976 | Boyreau | 283/57 |
| 5,063,600 A | * | 11/1991 | Norwood | 382/13 |
| 5,463,725 A | * | 10/1995 | Henckel et al. | 395/155 |
| 6,229,502 B1 | * | 5/2001 | Schwab | 345/901 |
| 6,297,812 B1 | * | 10/2001 | Ohara et al. | 345/173 |
| 6,320,591 B1 | * | 11/2001 | Griencewic | 345/901 |

FOREIGN PATENT DOCUMENTS

EP     0 542 524     * 5/1993     ........... G06F/15/30

* cited by examiner

*Primary Examiner*—Amare Mengistu
(74) *Attorney, Agent, or Firm*—Michael Chan

(57) ABSTRACT

A three-dimensional check image viewer comprises a display device and a processing unit. The processing unit includes means for (i) displaying on the display device an image of a first check, and (ii) displaying on the display device an image of a second check such that the images appear three-dimensional relative to each other. An input device is provided for allowing an operator to manipulate the images such that any relative movement between the images on the display device appears three-dimensional to the operator.

6 Claims, 13 Drawing Sheets

THREE-DIMENSIONAL CHECK IMAGE VIEWER AND A METHOD OF HANDLING CHECK IMAGES IN AN IMAGE-BASED CHECK PROCESSING SYSTEM

BACKGROUND OF THE INVENTION

The present invention relates to check processing systems, and is particularly directed to a three-dimensional check image viewer and a method of handling check images in an image-based check processing system.

In some known image-based check processing systems, an image of one side of a check is displayed on a display device. An image of the other side of the check may also be displayed on the display device. At the same time, an image of either one or both sides of another check may also be displayed on the display device. An operator is usually able to manipulate displayed check images in a number of different ways. For example, an image associated with one side of a particular check may be "rotated" and/or moved around on the display device relative to other images appearing on the display device. Also, the image associated with the one side of the particular check may be "flipped" around such that an image of the other side of the particular check is displayed on the display device.

Although different images of a number of different checks may be displayed on a display device in known image-based check processing systems, such displayed images are separate from each other as they appear on the display device. The separate check images on the display device are essentially presented in a two-dimensional manner for an operator to view. A drawback in presenting separate check images in a two-dimensional manner on a display device for an operator to view and manipulate is that operators typically do not manipulate real world physical checks in a two-dimensional manner.

Operators in real world typically manipulate physical checks in a three-dimensional manner. Since operators manipulate physical checks in a three-dimensional manner in the real world, it would be desirable to display check images on a display device in a three-dimensional manner so that the operator is able to manipulate such three-dimensional check images in the same way as manipulating physical checks in the real world.

SUMMARY OF THE INVENTION

In accordance with one aspect of the present invention, a three-dimensional check image viewer comprises a display device and a processing unit. The processing unit includes means for (i) displaying on the display device an image of a first check, and (ii) displaying on the display device an image of a second check such that the images appear three-dimensional relative to each other. An input device is provided for allowing an operator to manipulate the images such that any relative movement between the images on the display device appears three-dimensional to the operator.

Preferably, the processing unit includes (i) circuitry which monitors the input device, and (ii) circuitry which provides output signals to the display device. The input device includes a touch-sensitive input device which overlies the display device. A program memory which stores instructions of programs is provided for enabling the processing unit to monitor signals from the touch-sensitive input device and to provide output signals to the display device in response to the signals from the touch-sensitive input device.

In accordance with another aspect of the present invention, a method of handling check images in an image-based check processing system having a display device and an input device comprises the steps of (a) displaying on the display device an image of a first check, and (b) displaying on the display device an image of a second check such that the images appear three-dimensional relative to each other to allow an operator to manipulate the images such that any relative movement between the images on the display device appears three-dimensional to the operator. The check image of the first check may overlie the check image of the second check on the display device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

Figure 1:
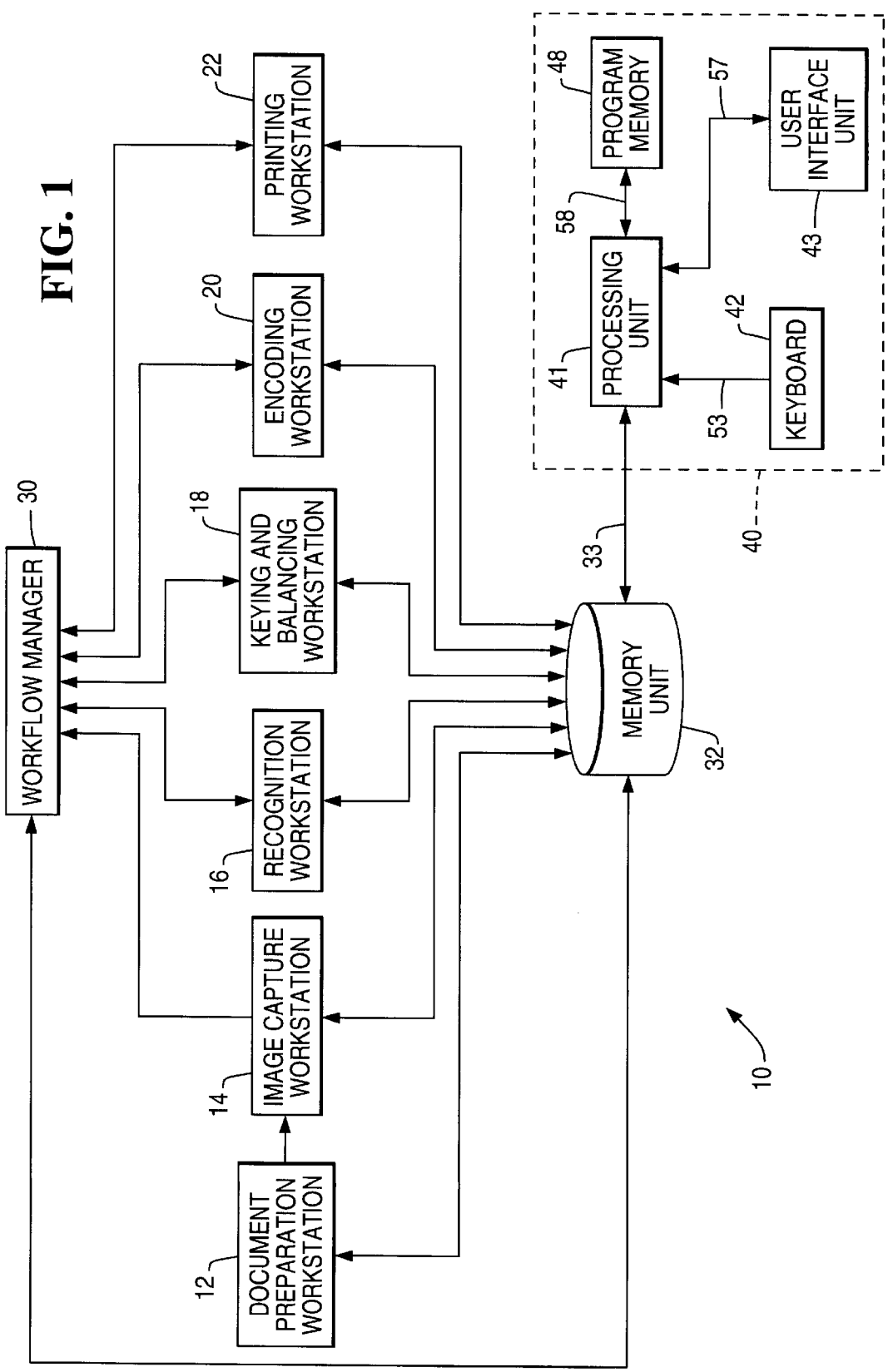
FIG. 1 is a schematic block representation of an image-based check processing system embodying the present invention.

The present invention is directed to a three-dimensional check image viewer and a method of handling check images in an image-based check processing system. An image-based check processing system 10 embodying the present invention is illustrated in FIG. 1. The image-based check processing system 10 comprises different types of workstations including a document preparation workstation 12, an image capture workstation 14, a recognition workstation 16, a keying and balancing workstation 18, an encoding workstation 20, and a printing workstation 22. The image capture workstation 14 creates units of work and submits the created work to a workflow manager 30 in a known way. Each of the workstations 16, 18, 20, 22 polls the workflow manager 30 in a known manner for work to perform, and may also create units of work which is submitted back to the workflow manager 30.

At the document preparation workstation 12, transaction items including a number of debit items and a number of credit items associated with each transaction are prepared for further processing. Typical transaction items include checks, deposit slips, and adding machine tapes. Checks, deposit slips, and certain other transaction items are classified as proof items. Adding machine tapes are classified as non-proof items. Preparation of the transaction items may include removal of paper clips, staples, and the like, and stacking of the items in a particular order and/or direction in suitable trays. The trays containing the stacked items are then manually carted to the image capture workstation 14.

At the image capture workstation 14, the stacked items in the trays are manually removed from the trays and placed onto an image lift transport (not shown) of the image capture workstation 14. If the item being processed is an adding machine tape, then a tape scanner (not shown) of known design and construction captures an electronic image of the adding machine tape and stores the image in a memory unit 32. If the item being processed is a proof item such as a deposit slip, then the deposit slip is moved along a transport track of he image lift transport in front of a front image lift camera and in front of a rear image lift camera (both not shown). The image lift camera optically scans each proof item as the proof item moves along the transport track in front of the cameras to produce front-and rear electronic images of the proof item. These images are also stored in the memory unit 32. Other proof items (transaction balancing slips, for example) are processed in the same manner.

If the item being processed is a proof item such as a check, then electronic images of the check are stored in the memory unit 32 along with a unique sequence number. If the check being processed contains a MICR codeline, the MICR codeline is read as the check passes by a MICR reader (not shown). Alternatively, if the check being processed contains an OCR codeline, the OCR codeline is read as the check passes by an OCR reader. For simplicity, it is assumed that the check being processed contains a MICR codeline. The MICR codeline is associated with the front and rear electronic images and is also stored in the memory unit 32. Suitable endorsement is printed onto the check as the check passes an endorser module (not shown). An endorsement status associated with the check is then stored in the memory unit 32 along with the other information associated with the check. Also, the check is microfilmed as the check passes a microfilmer (not shown). A microfilm status associated with the check is stored in the memory unit 32.

After the images of a check are lifted by the image lift cameras and the electronic images, the sequence number, and the MICR codeline are captured, and the check is endorsed and microfilmed, the check is sorted into an appropriate sorter pocket (not shown) of the image capture workstation 14. Preferably, the image capture workstation 14 includes the Model 7780 Item Processing System, manufactured by NCR Corporation, located in Dayton, Ohio. The sorted checks in each of the sorter pockets are stacked in a respective tray. The trays are then manually carted to the encoder workstation 20. The trays of checks are encoded in a known manner at the encoder workstation 20 while the electronic images, the sequence numbers, and the MICR codelines of the checks which were earlier captured and stored in the memory unit 32 at the image capture workstation 14 are processed by the recognition workstation 16 and the keying and balancing workstation 18 in the manner described hereinbelow. An encoder status associated with the check is stored in the memory unit 32.

At the recognition workstation 16, the electronic images of the checks stored in the memory unit 32 after being processed at the image capture workstation 14 are processed using known recognition techniques to determine the "amount" associated with each check. The amount of each check is then associated with the corresponding electronic images and the MICR codeline of the check and stored in the memory unit 32. A one-to-one correspondence is thereby established between the electronic images, the sequence number, the MICR codeline, the endorsement status, the encoder status, and the microfilm status of each check and the amount associated with that particular check. Accordingly, a database containing electronic images, the sequence number, the MICR codeline, the endorsement status, the encoder status, the microfilm status, and the amount associated with each check is thereby created and stored in the memory unit 32.

It should be noted that some amounts will not be recognizable to the recognition workstation 16. Also, some amounts recognized at the recognition workstation 16 may have a low confidence level associated therewith. These items are identified and then processed further at the keying and balancing workstation 18.

Figure 2:
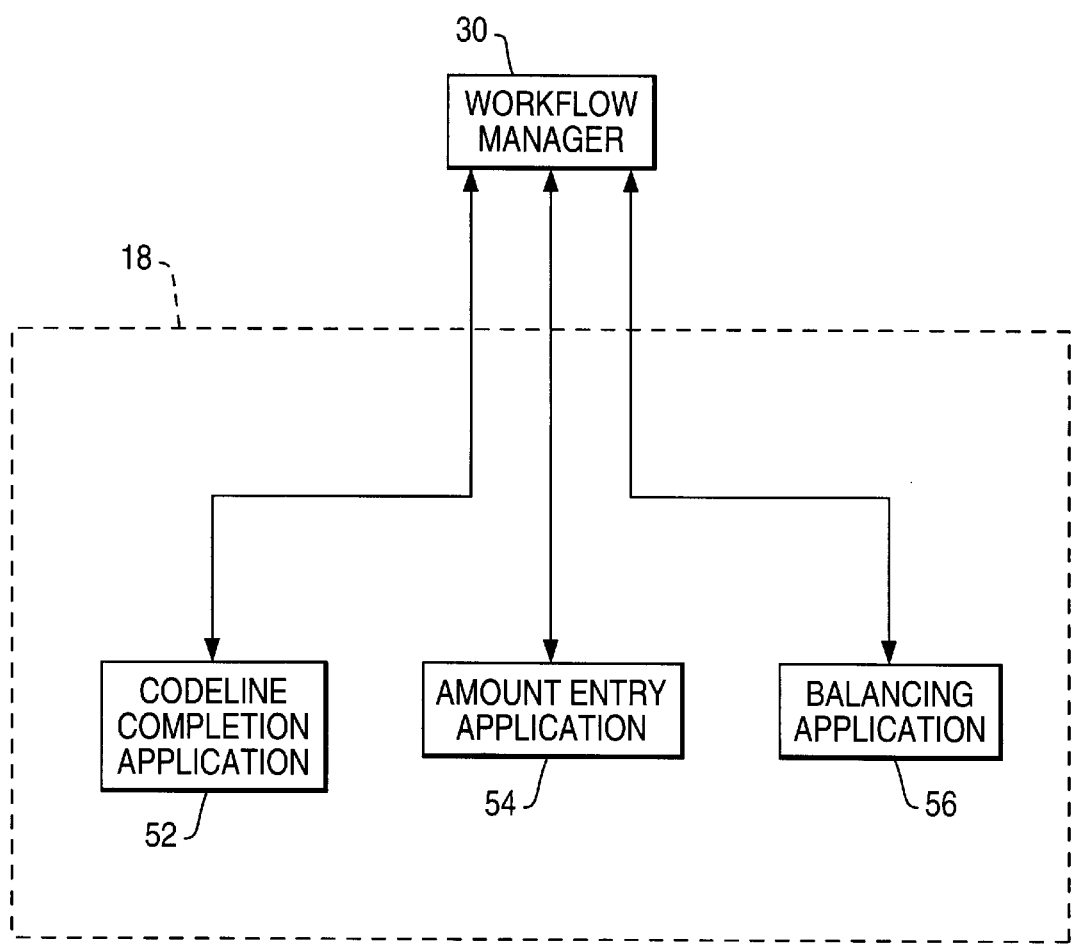
FIG. 2 is an enlarged schematic block representation of a portion of the image-based check processing system of FIG. 1.

As shown in FIG. 2, the keying and balancing workstation 18 comprises a number of applications including a codeline completion application 52, an amount entry application 54, and a balancing application 56. Each of the applications 52, 54, 56 communicates with the workflow manager 30 and receives units of work to process from the workflow manager 30 in response to units of work being completed by the recognition workstation 16.

Figure 5:
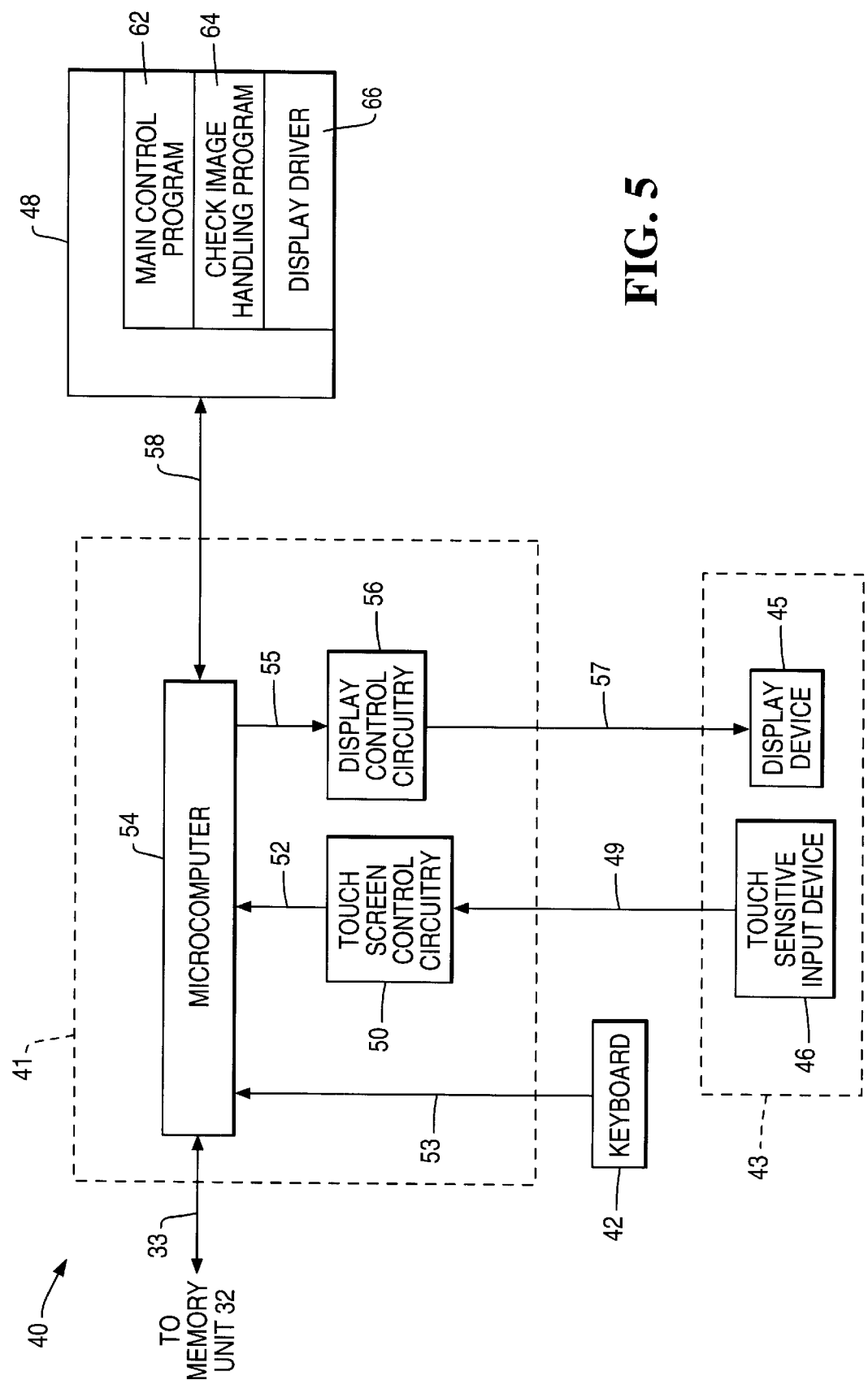
FIG. 5 is a block diagram representation of the image display terminal of FIG. 3.

Referring again to FIG. 1, the image-based check processing system 10 further includes an image display terminal 40 associated with the keying and balancing workstation 18. The image display terminal 40 includes a processing unit 41 which receives input signals on line 53 from a keyboard 42. The processing unit 41 and the memory unit 32 communicate with each other on line 33. The processing unit 41 processes data from the memory unit 32 and provides output signals on line 57 to a user interface unit 43 in response to this processed data and input signals on line 53 from the keyboard 42. The user interface unit 43 includes a display output device 45 (FIG. 5) and a touch-sensitive input device 46 (FIG. 5) which, preferably, overlies the display device 45. The image display terminal 40 further includes a program memory 48 which communicates on line 58 with the processing unit 41. As shown in FIG. 5, a main control program 62, a check image handling program 64, and a display driver 66 are stored in the program memory 48.

An operator at the image display terminal 40 associated with the keying and balancing workstation 18 has a multiple number of applications from which to select. The operator may select the codeline completion application 52 from an application selection menu (not shown) which enables the operator to manually complete the MICR (magnetic ink character recognition) codeline which identifies the particular transaction document item. More specifically, the workflow manager 30 establishes, in a known way, any items with either missing or rejected MICR-related information. These items are displayed on the display device 45 of the user interface unit 43 at the keying and balancing workstation 18. The operator at the image display terminal 40 associated with the keying and balancing workstation 18 completes the codelines of the items identified as having either missing or rejected MICR-related information.

An operator at the image display terminal 40 associated with the keying and balancing workstation 18 may also select the amount entry application 54 which enables the operator to manually complete the amount of the debit items and the credit items, as the case may be. More specifically, after the MICR codelines of all of the items have completed, the workflow manager 30 establishes, in a known way, any items with either missing, rejected, or low confidence amount information from the recognition workstation 16. These items are displayed on the display device 45 of the user interface unit 43 of the image display terminal 40. The operator at the image display terminal 40 associated with the keying and balancing workstation 18 completes the amount field of the items identified as having missing, rejected, or low confidence amounts.

An operator at the image display terminal 40 associated with the keying and balancing workstation 18 may also select the balancing application 56 which enables the operator to balance out-of-proof transactions. More specifically, after the amount fields of all of the items have been completed, the workflow manager 30 establishes, in a known way, any batches of items containing transactions which are out-of-proof. It is contemplated that more than one operator may be dedicated to the function of completing codelines of items at the keying and balancing workstation 18. Also, more than one operator may be dedicated to the function of completing the amount fields of items at the keying and balancing workstation 18. Similarly, more than one operator may be dedicated to the function of balancing batches of items at the keying and balancing workstation 18.

As an example, a typical system may include one codeline operator, four amount keying operators, and two balancing operators. Each operator processes a "batch" of transactions. Typically, a batch of transactions includes a number of different transactions. Although the foregoing describes a "batch" containing multiple transactions, it is contemplated that a "block" containing multiple batches may be processed in the same manner. A block or a batch containing multiple transactions may sometimes be referred to as a "unit of work".

Figure 3:
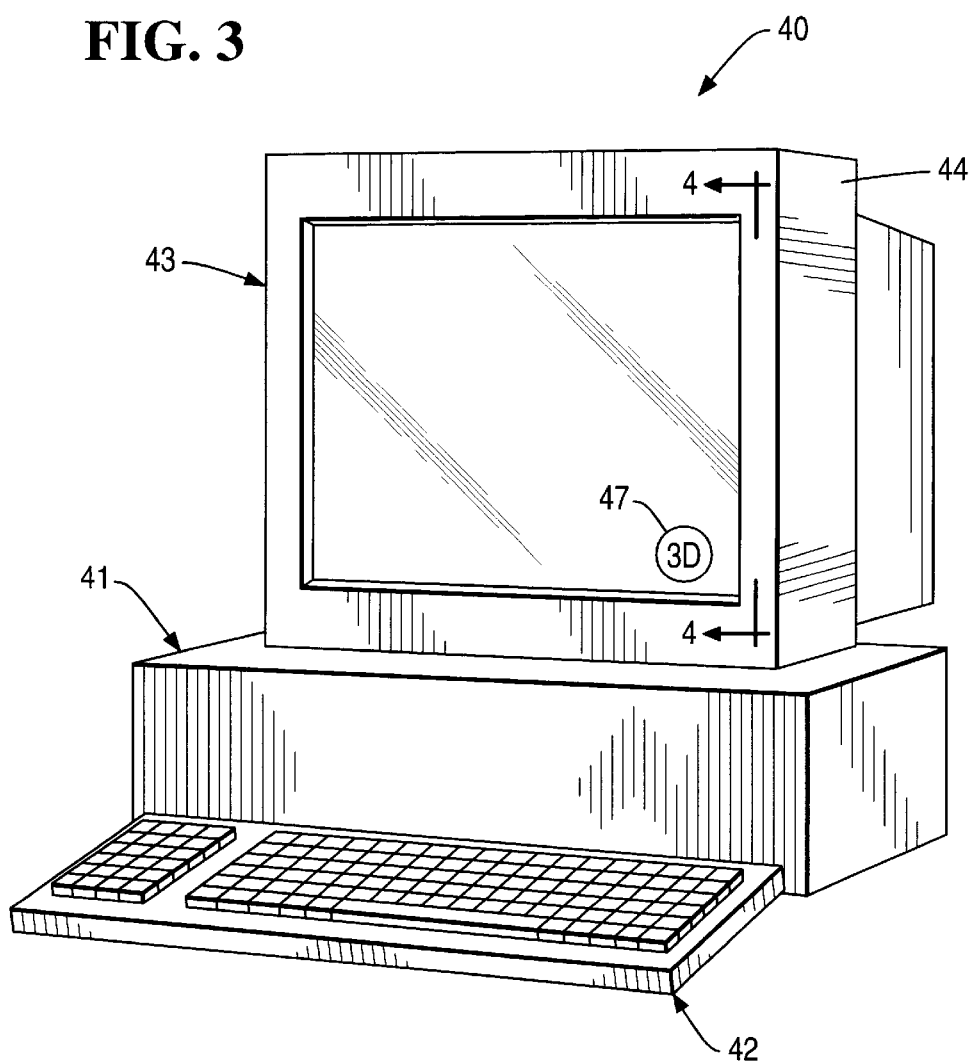
FIG. 3 is a perspective view of an image display terminal used in the image-based check processing system of FIG. 1.
Figure 4:
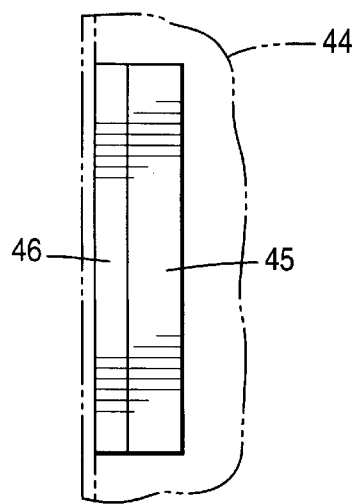
FIG. 4 is a sectional view, taken approximately along line 4—4 of FIG. 3, showing a touch-sensitive input device overlying a display device.

Referring to FIGS. 3–5, the user interface unit 43 has a housing 44 in which the display device 45 and the touch-sensitive input device 46 are disposed. As previously stated, the touch-sensitive input device 46 preferably overlies the display device 45. The touch-sensitive input device 46 may be of the type which uses capacitive current to provide an output signal indicative of the location at which the touch-sensitive input device 46 is being touched. The touch-sensitive input device 46 provides signals on line 49 (shown only in FIG. 5) which are processed by known touch-screen control circuitry 50 before being provided as signals on line 52 to the processing unit 41. The touch-screen control circuitry 50 continually monitors the touch-sensitive input device 46 for sensing any touching or "dragging" event which occurs on the touch-sensitive input device 46.

With reference to FIG. 5, the processing unit 41 receives data on line 33 from the memory unit 32, input signals on line 53 from the keyboard 42, and input signals on line 52 from the touch-screen control circuitry 46 and provides output signals on line 55 to display control circuitry 56 in response thereto. Preferably, the processing unit 41 includes a microcomputer 54 which communicates via signals on line 58 with the program memory 48. Suitable microcomputers and memories are readily available in the marketplace. Their structure and operation are well known and, therefore, will not be described.

The microcomputer 54 processes input signals from the touch-sensitive input device 46 and the keyboard 42 in accordance with instructions of the main control program 62 and instructions of the check image handling program 64. More specifically, the microcomputer 54 receives input signals on line 53 from the keyboard 22 and input signals on line 52 from the touch-screen control circuitry 50, and processes these input signals in accordance with instructions of the main control program 62 and the check image handling program 64. The microcomputer 54 then provides output signals on line 55 to display control circuitry 56 in accordance with instructions of the display driver 66. The display control circuitry 56 in turn provides output signals on line 57 to the display device 45 to be displayed. The structure and operation of the display control circuitry 56 are well known and, therefore, will not be described.

Referring again to FIG. 3, an image of a three-dimensional mode key 47 (shown as "3D") appears in the vicinity of the lower right corner of the display device 45. When an operator desires to view check images in a three-dimensional manner in accordance with the present invention, the operator first touches the "3D" key 47 to enter three-dimensional viewing mode.

Figure 6:
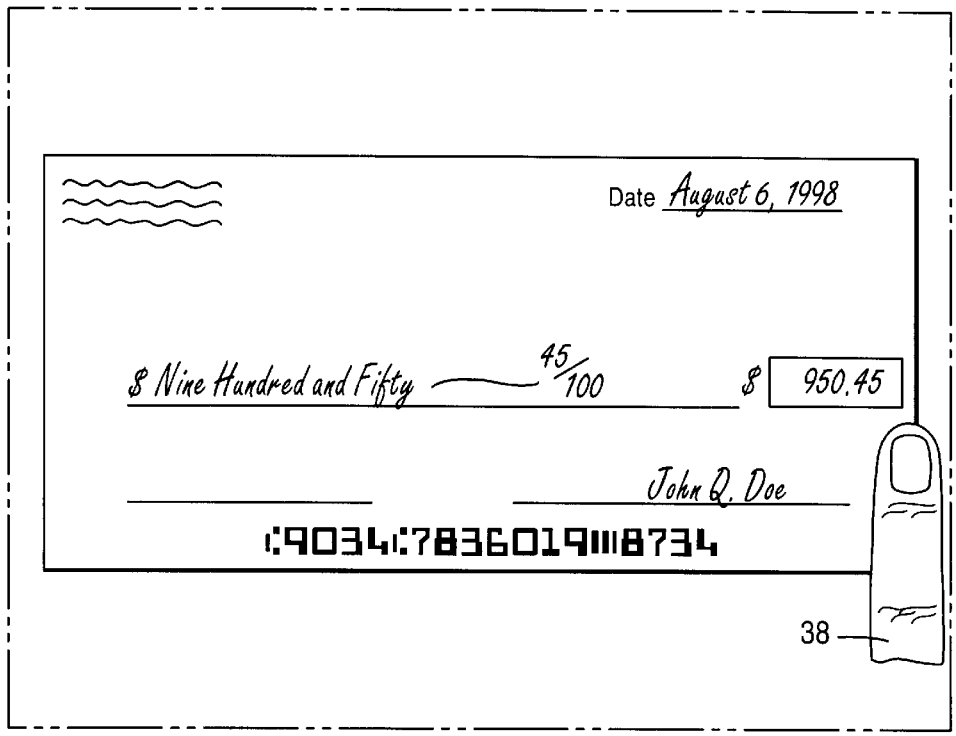
FIG. 6 is an enlarged view of a number of check images displayed on the display device of the image display terminal of FIGS. 3–5.
Figure 7:
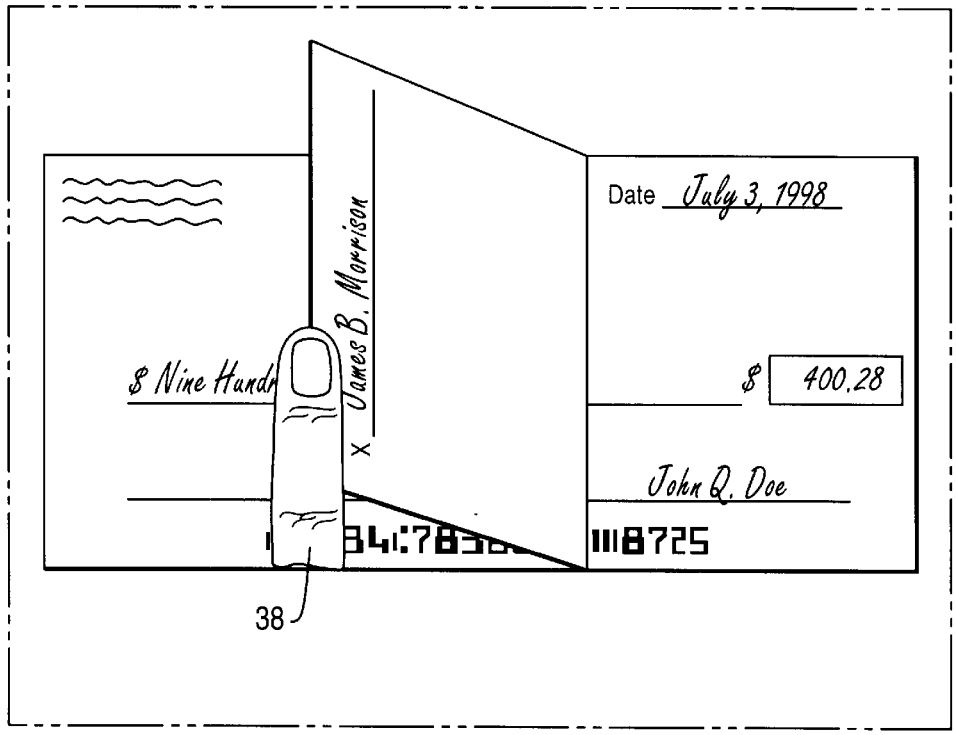
FIGS. 7 and 8 are views similar to FIG. 6 and showing the check images of FIG. 6 in different positions.

Then, as shown in FIG. 6, to move a selected check image from one position to another position on the display device 45, a finger 38 of a user is placed on the touchsensitive input device 46 in the vicinity of the right edge of the check image. After the finger 38 is placed on the touch-sensitive input device 46 at the initial location such as shown in FIG. 6, the finger 38 is moved to the left across the touch-sensitive input device 46 to another location on the touch-sensitive input device 46 such as shown in FIG. 7. The finger 38 remains in contact with the touch-sensitive input device 46 during movement of the finger 38 from the position shown in FIG. 6 to the position shown in FIG. 7.

As the finger 38 moves from the position shown in FIG. 6 to the position shown in FIG. 7, the selected check image is "peeled" away from its initial position shown in FIG. 6 to the position shown in FIG. 7. As the finger 38 continues to move from the position shown in FIG. 7 to the position shown in FIG. 8, the selected check image continues to be "peeled" way from the position shown in FIG. 7 to the position shown in FIG. 8.

Figure 8:
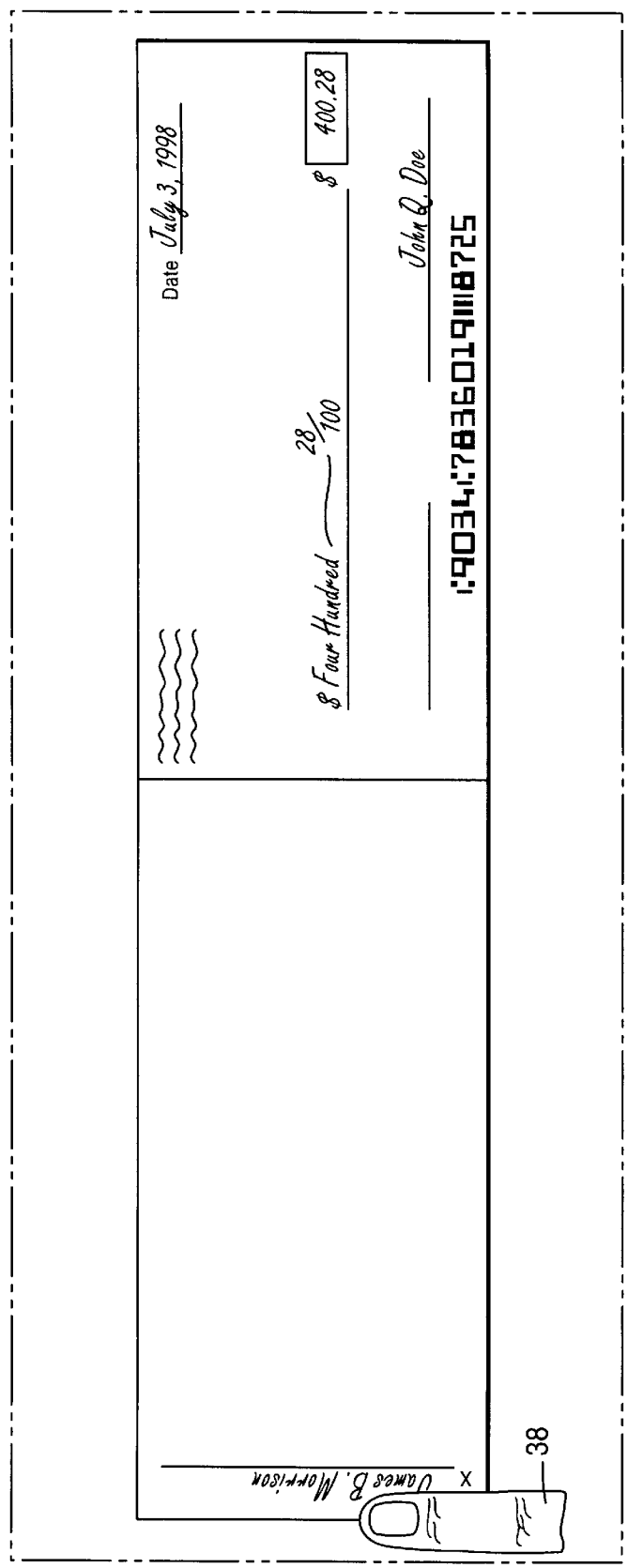
Figure 9A:
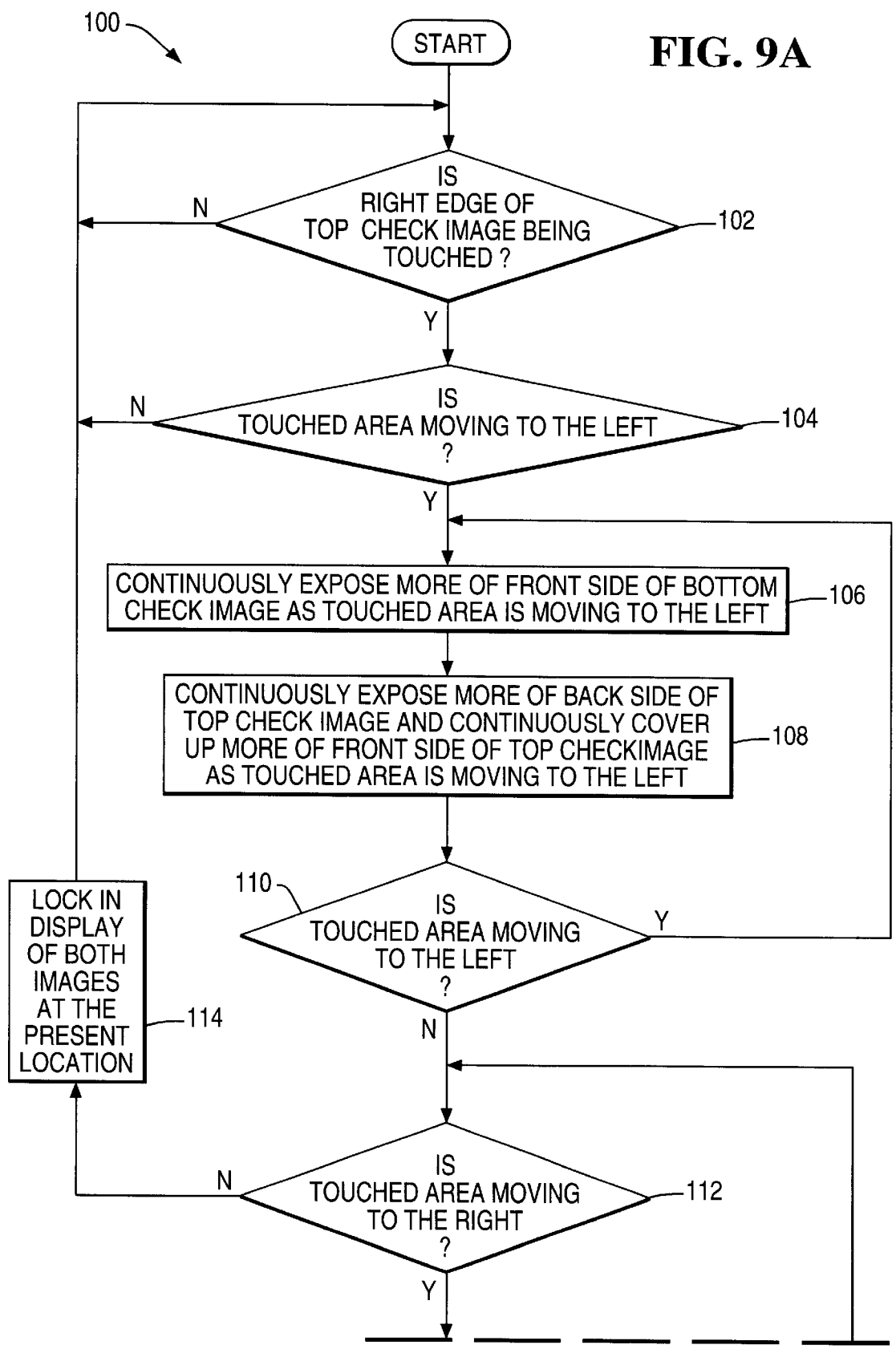
FIG. 9 is a flowchart depicting operation of the image display terminal of FIGS. 3–5 in accordance with the present invention.
Figure 9B:
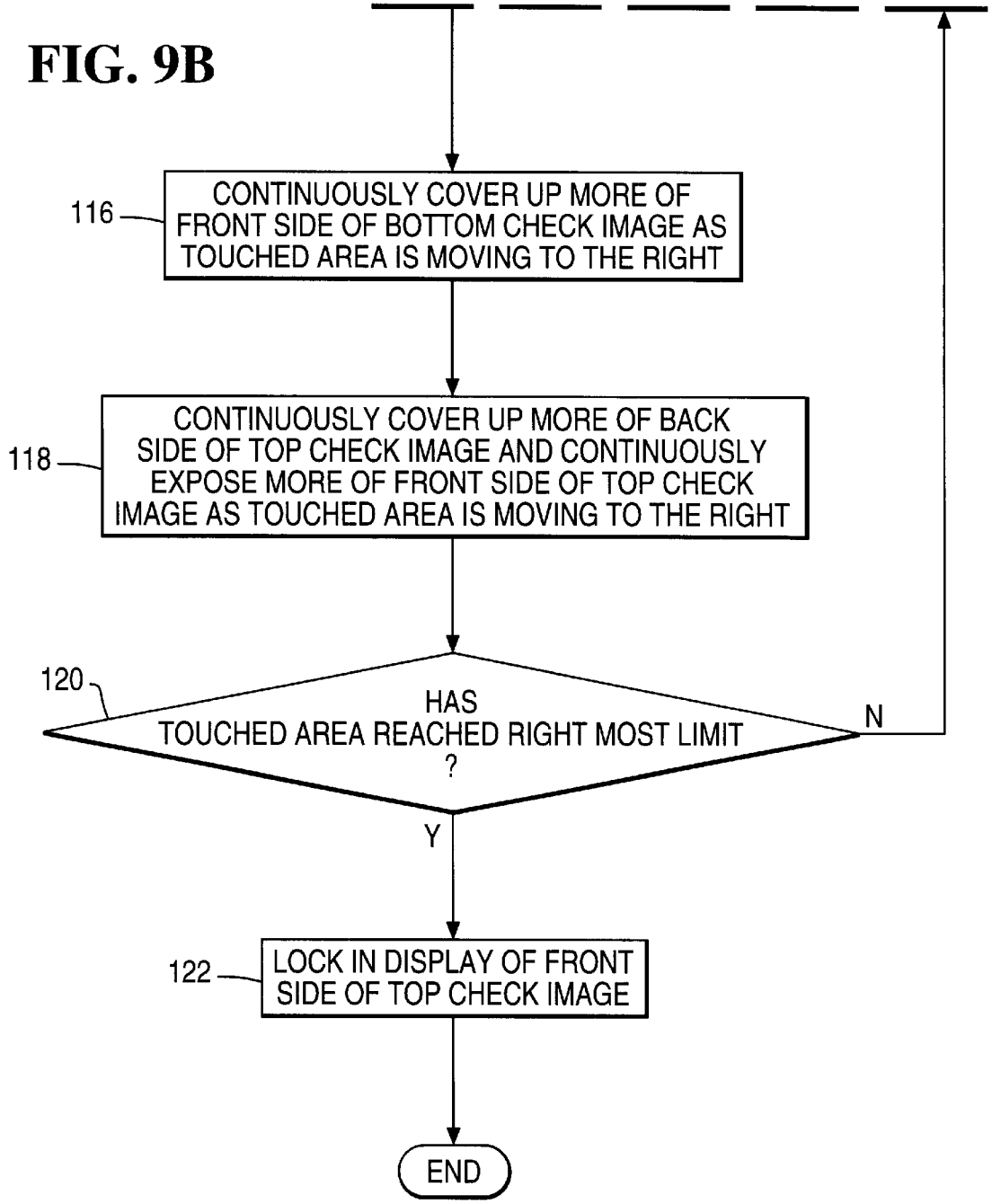

Referring to FIG. 9, a flowchart 100 depicts cooperation of the main control program 62 and the check image handling program 64 to create the three-dimensional check image viewer as just described hereinabove with reference to FIGS. 6–8. As shown in step 102 of FIG. 9, a determination is made as to whether the right edge of the top check image, as shown in FIG. 6, is being touched. If the determination in step 102 is negative, the process returns to START. If the determination in step 102 is affirmative, the process proceeds to step 104 in which a determination is made as to whether the area being touched in step 102 is moving to the left, as viewed looking at FIG. 6. If the determination in step 104 is negative, the process returns to START. If the determination in step 104 is affirmative, the process proceeds to step 106.

In step 106, more of the front side of the bottom check image is being continuously exposed for the operator to view as the areas being touched is moving to the left. As more of the front side of the bottom check image is being continuously exposed for the operator to view, more of the back side of the top check image is being continuously exposed for the operator to view, as shown in step 108. A determination is made in step 110 as to whether the area being touched is still moving to the left. If the determination in step 110 is affirmative, the process loops back to repeat steps 106 and 108. However, if the determination in step 110 is negative, the process proceeds to step 112.

In step 112, a determination is made as to whether the area being touched is moving to the right as viewed looking at FIGS. 6–8. If the determination in step 112 is negative, the process proceeds to step 114 in which the image of the top check and the image of the bottom check, as exposed at that moment, is locked in place on the display device 45. The process then returns to START. However, if the determination in step 112 is affirmative, the process proceeds to steps 116 and 118.

In steps 116 and 118, more of the front side of the bottom check image is being continuously covered up the area being touched is moving to the right. As more of the front side of the bottom check image is being continuously covered up, more of the back side of the top check image is being continuously covered up and more of the front side of the top check image is being continuously exposed for the operator to view. The process then proceeds to step 120 in which a determination is made as to whether the area being touched has reached a rightmost limit. If the determination in step 120 is negative, the process returns back to step 112 to determine if the area being touched is still moving to the right. If affirmative, steps 116 and 118 are repeated. However, if the determination in step 120 is affirmative, the process proceeds to step 122 in which the entire front side of the top check image is locked in place on the display device 45 for the operator to view.

Figure 10:
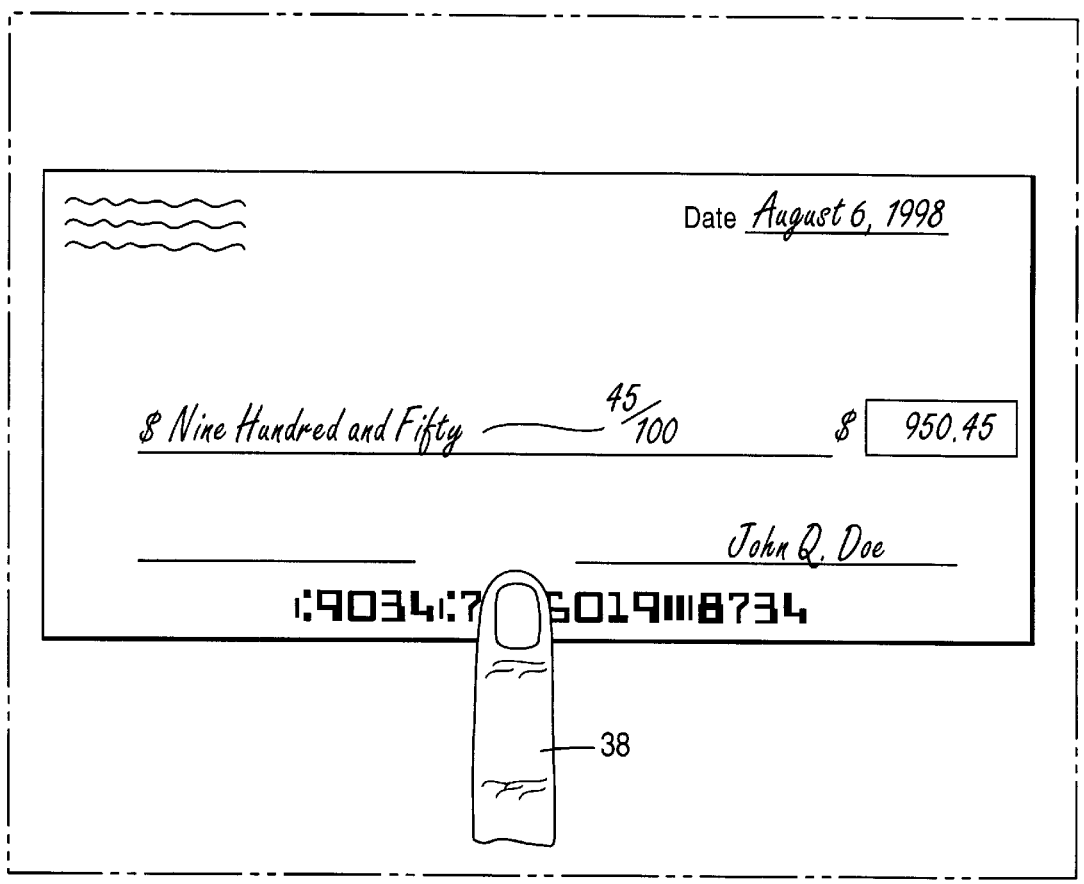
FIG. 10 is a view similar to FIG. 6 and showing a number of different check images displayed on the display device of the image display terminal of FIGS. 3–5.
Figure 11:
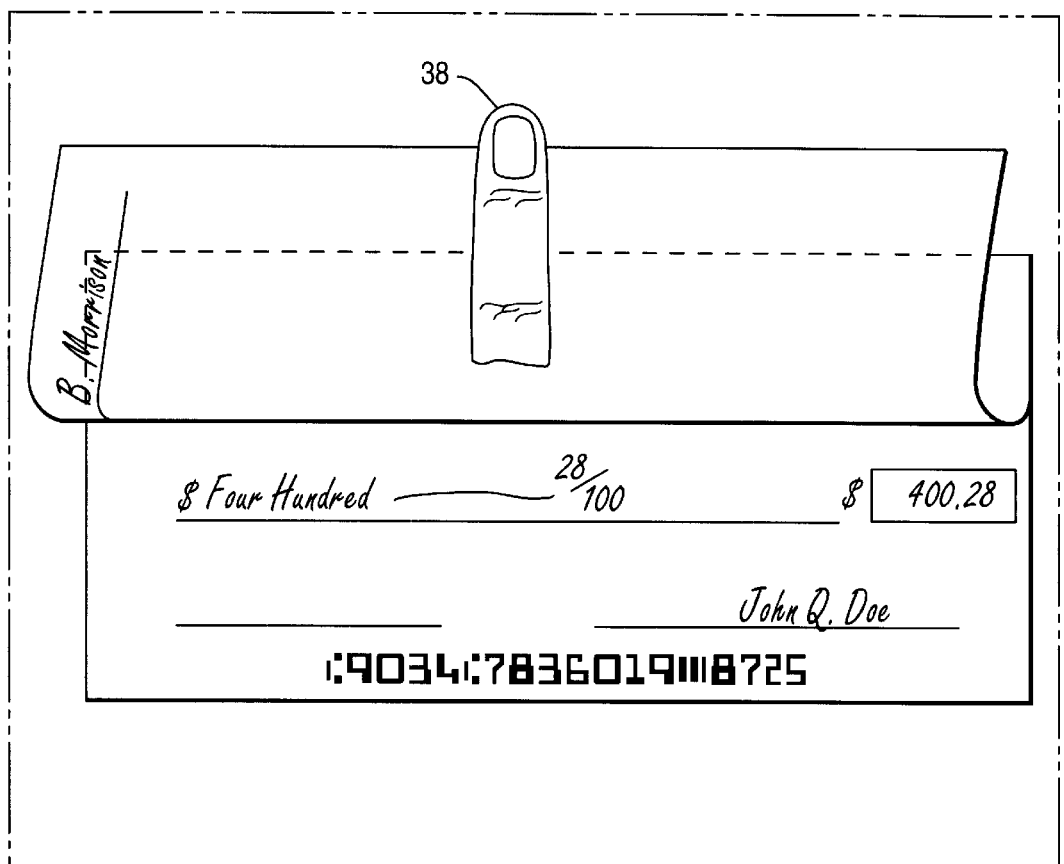
FIGS. 11 and 12 are views similar to FIG. 10 and showing the check images of FIG. 10 in different positions.
Figure 12:
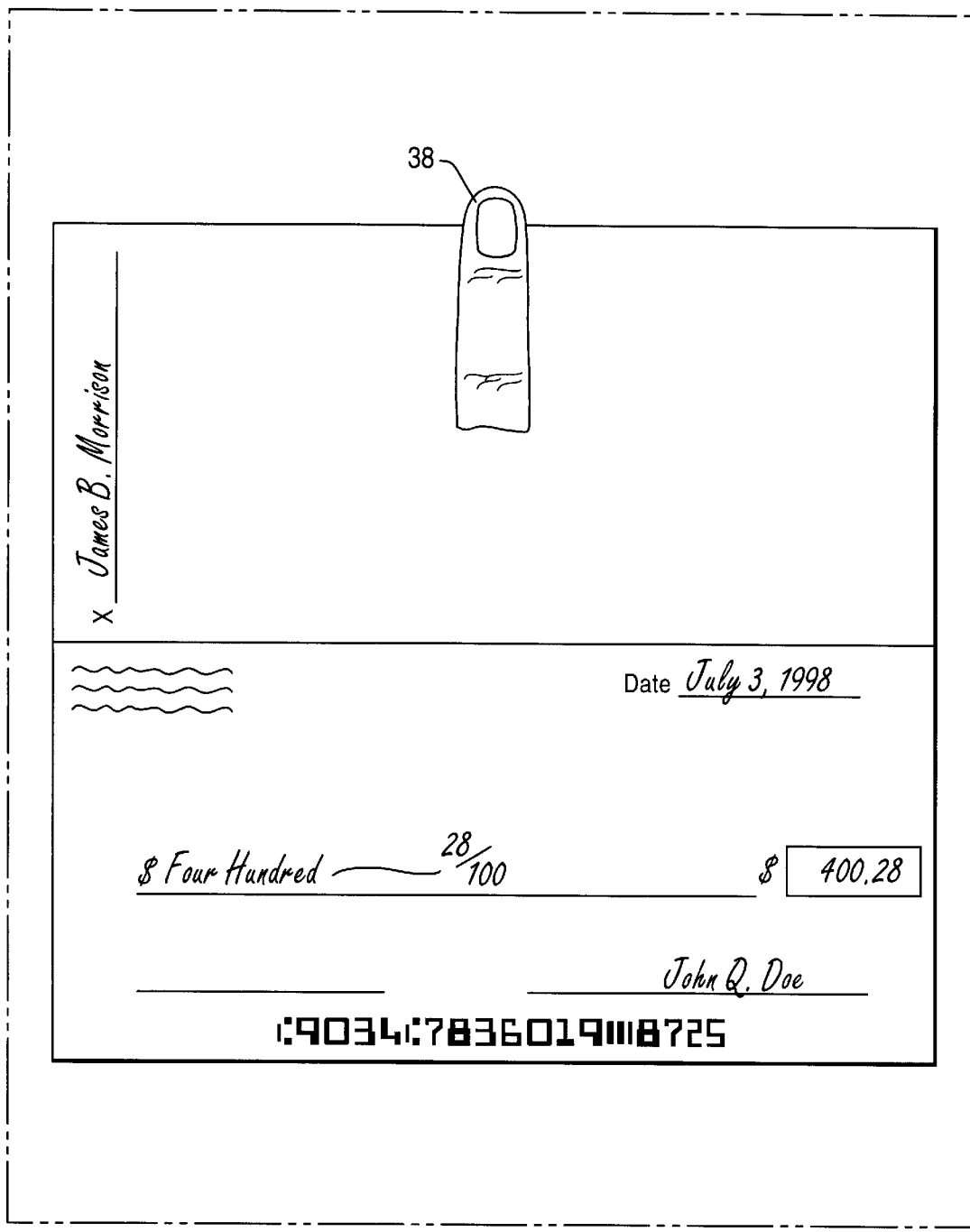

Referring to FIGS. 10–12, a variation of the check images shown in FIGS. 6–8 is provided. FIG. 10 is similar to FIG. 6 except that the finger 38 is initially placed on the touch-sensitive input device 46 in the vicinity of the bottom edge of the top check image. After the finger 38 is placed on the touch-sensitive input device 46 at the initial location such as shown in FIG. 10, the finger 38 is moved upwards across the touch-sensitive input device 46 to another location on the touch-sensitive input device 46 such as shown in FIG. 11. The finger 38 remains in contact with the touch-sensitive input device 46 during movement of the finger 38 from the position shown in FIG. 10 to the position shown in FIG. 11.

As the finger 38 moves from the position shown in FIG. 10 to the position shown in FIG. 11, the selected check image is "peeled" away from its initial position shown in FIG. 10 to the position shown in FIG. 11. As the finger 38 continues to move from the position shown in FIG. 11 to the position shown in FIG. 12, the selected check image continues to be "peeled" away from the position shown in FIG. 11 to the position shown in FIG. 12.

Figure 13:
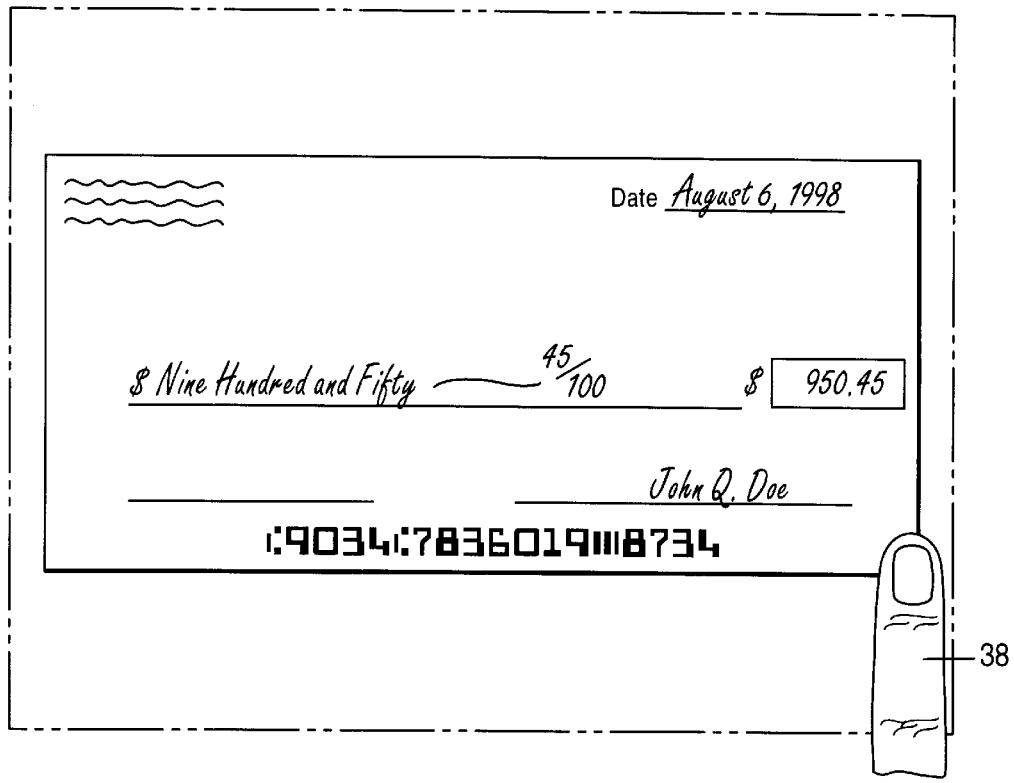
FIG. 13 is a view similar to FIG. 6 and showing a number of different check images displayed on the display device of the image display terminal of FIGS. 3–5.
Figure 14:
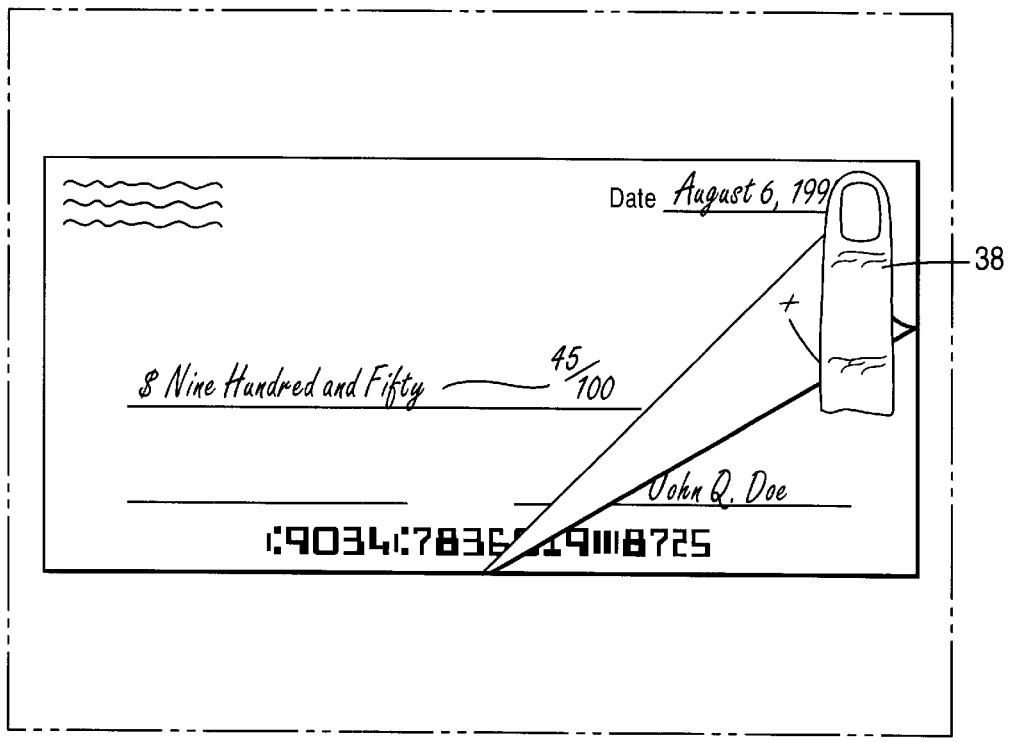
FIGS. 14 and 15 are views similar to FIG. 13 and showing the check images of FIG. 13 in different positions.
Figure 15:
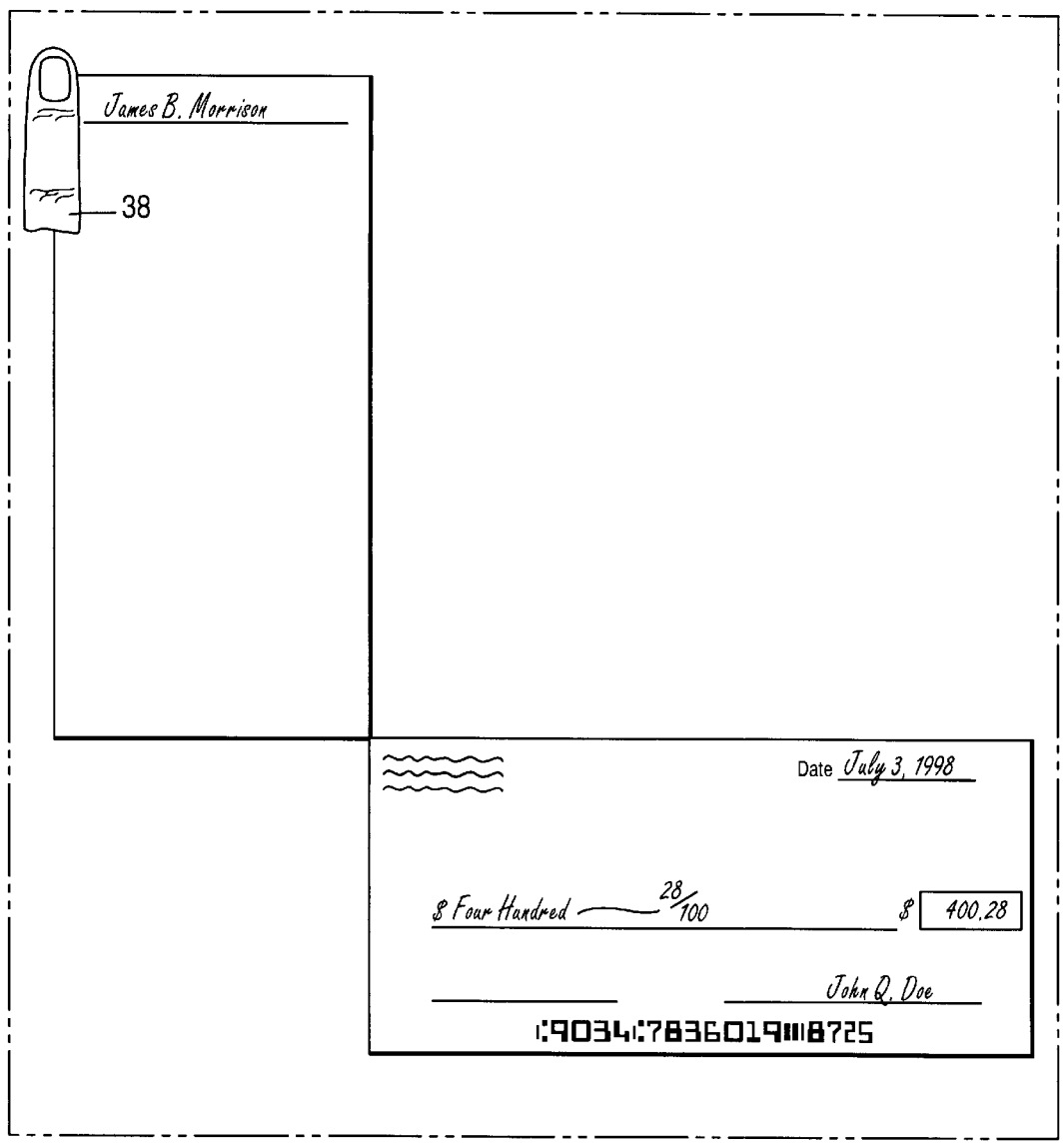

Referring to FIGS. 13–15, another variation of the check images shown in FIGS. 6–8 is provided. FIG. 13 is similar to FIG. 6 except that the finger 38 is initially placed on the touch-sensitive input device 46 in the vicinity of the bottom right corner of the top check image. After the finger 38 is placed on the touch-sensitive input device 46 at the initial location such as shown in FIG. 13, the finger 38 is moved diagonally across the touch-sensitive input device 46 to another location on the touch-sensitive input device 46 such as shown in FIG. 12. The finger 38 remains in contact with the touch-sensitive input device 46 during movement of the finger 38 from the position shown in FIG. 13 to the position shown in FIG. 14.

As the finger 38 moves from the position shown in FIG. 13 to the position shown in FIG. 14, the selected check image is "peeled" away from its initial position shown in FIG. 13 to the position shown in FIG. 14. As the finger 38 continues to move from the position shown in FIG. 14 to the position shown in FIG. 15, the selected check image continues to be "peeled" away from the position shown in FIG. 14 to the position shown in FIG. 15.

A number of advantages result by providing a three-dimensional check viewer in accordance with the present invention. One advantage is that the three-dimensional check image viewer provides an operator of an image-based check processing system with a real world appearance of images of a plurality of checks. The three-dimensional check image viewer functions as a completely natural interface to the operator and allows the operator to manipulate check images as simple, natural objects. The operator is also able to manipulate virtual "stacks" of check images in the same way as manipulating stacks of checks in the real world using one's hands.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. An image-based check processing system comprising:
    an image capture workstation for capturing image data which is representative of images of checks;
    a recognition workstation for processing images of checks which have been captured at the image capture workstation to determine the amounts of the checks;
    a keying and balancing workstation including at least one application program for processing images of checks which have been processed by the recognition workstation;
    a display device associated with the keying and balancing workstation and for displaying an image of a virtual stack of unbound checks being processed at the keying and balancing workstation and images of checks contained in the virtual stack of unbound checks;
    a touch-sensitive input device adjacent to the display device; and
    means for enabling a user to touch a first location on the touch-sensitive input device corresponding to at least a portion of a frontside image of a first check on the virtual stack of unbound checks and then to move to a second location which is different from and away from the first location on the touch-sensitive input to peel the frontside image of the first check on the virtual stack of unbound checks away from the image of the virtual stack of unbound checks to allow the user to view on the display device a backside image of the first check and a frontside image of a second check on the virtual stack of unbound checks as the user moves from the first location on the touch-sensitive input device to the second location on the touch-sensitive input device.

2. An image-based check processing system according to claim 1, wherein the at least one application program includes at least one of a codeline completion application, an amount entry application, and a balancing application.

3. An image-based check processing system according to claim 1, wherein the at least one application program includes a codeline completion application, an amount entry application, and a balancing application.

4. A method of operating an image-based check processing system, the method comprising the steps of:
    capturing images of checks;
    determining the amounts of the checks based upon the captured images of the checks;
    displaying on a display device an image of a virtual stack of unbound checks and images of checks contained in the virtual stack of unbound checks whose amounts have been undetermined; and peeling the image of the check on top of the virtual stack of unbound checks away from the image of the virtual stack of unbound checks when a user touches a first location on a touch-sensitive input device corresponding to at least a portion of a frontside image of a first check on the virtual stack of unbound checks and then moves to a second location which is different from and away from the first location on the touch-sensitive input device to allow the user to view on the display device a backside image of the first check and a frontside image of a second check on the virtual stack of unbound checks as the user moves from the first location on the touch-sensitive input device to the second location on the touch-sensitive input device.

5. An image-based check processing system comprising:

a keying and balancing workstation including at least one of a number of application programs selectable by a user to process images of checks, the number of application programs including a codeline completion application, an amount entry application, and a balancing application;

a display device associated with the keying and balancing workstation and for displaying images of checks being processed at the keying and balancing workstation; and means for enabling a user to peel a frontside image of a first check being processed at the keying and balancing workstation away from a frontside image of a second check being processed at the keying and balancing workstation such that the user can view on the display device a backside image of the first check and the frontside image of the second check as the user peels the frontside image of the first check away from the frontside image of the second check.

6. An image-based check processing system comprising:

a keying and balancing workstation including a number of application programs selectable by a user to process images of checks, the number of application programs including a codeline completion application, an amount entry application, and a balancing application;

a display device associated with the keying and balancing workstation and for displaying images of checks being processed at the keying and balancing workstation; and means for enabling a user to peel a frontside image of a first check being processed at the keying and balancing workstation away from a frontside image of a second check being processed at the keying and balancing workstation such that the user can view on the display device a backside image of the first check and the frontside image of the second check as the user peels the frontside image of the first check away from the frontside image of the second check.

\* \* \* \* \*